US012800315B2

(12) United States Patent
Shiau et al.

(10) Patent No.: US 12,800,315 B2
(45) Date of Patent: Nov. 17, 2026

(54) TRACKING SYSTEM AND CALIBRATION METHOD

(71) Applicant: HTC Corporation, Taoyuan City (TW)

(72) Inventors: Jia-Yau Shiau, Taoyuan City (TW); Kuan-Hsun Wang, Taoyuan City (TW); Jun Rei Wu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 442 days.

(21) Appl. No.: 18/509,299

(22) Filed: Nov. 15, 2023

(65) Prior Publication Data

US 2024/0159540 A1 May 16, 2024

Related U.S. Application Data

(60) Provisional application No. 63/425,680, filed on Nov. 16, 2022.

(51) Int. Cl.

*G01C 21/16* (2006.01)
*G06F 3/0346* (2013.01)
*G06T 7/20* (2017.01)
*G06T 7/70* (2017.01)
*G06T 7/80* (2017.01)

(52) U.S. Cl.

CPC ....... *G01C 21/188* (2020.08); *G01C 21/1656* (2020.08); *G06F 3/0346* (2013.01); *G06T 7/20* (2013.01); *G06T 7/70* (2017.01); *G06T 7/80* (2017.01); *G06T 2207/30196* (2013.01); *G06T 2207/30244* (2013.01)

(58) Field of Classification Search

CPC .............. G01C 21/188; G01C 21/1656; G01C 25/005; G01C 21/16; G01C 21/183; G06F 3/0346; G06F 3/011; G06F 3/017; G06F 2203/012; G06T 7/20; G06T 7/70; G06T 7/80; G06T 2207/30196; G06T 2207/30244; G06V 10/34; G06V 40/103; G06V 40/23

See application file for complete search history.

(56) References Cited

U.S. PATENT DOCUMENTS 11,475,675 B2 * 10/2022 Urtasun .............. G06F 18/2155
2018/0364717 A1 * 12/2018 Douillard ................ G01S 17/58

FOREIGN PATENT DOCUMENTS

CN 113853508 A * 12/2021 ........ B60W 60/0015

* cited by examiner

*Primary Examiner* — Tung S Lau
(74) *Attorney, Agent, or Firm* — JCIPRNET

(57) ABSTRACT

A camera is configured to obtain camera data which includes a body image of a body portion of a user. An IMU sensor is configured to obtain sensor data and adapted to be mounted on the body portion. A processor is configured to determine the body portion being static or dynamic based on the camera data or the sensor data. In response to the body portion being static, the processor is configured to determine a pose confidence of a current pose of the body portion based on the camera data and calibrate an accumulative error of the sensor data based on the pose confidence and the camera data. In response to the body portion being dynamic, the processor is configured to calibrate the accumulative error based on a first moving track and a second moving track. The processor is configured to track the body portion based on the sensor data.

20 Claims, 7 Drawing Sheets

TRACKING SYSTEM AND CALIBRATION METHOD

CROSS-REFERENCE TO RELATED APPLICATION

This application claims the priority benefit of U.S. provisional application Ser. No. 63/425,680, filed on Nov. 16, 2022. The entirety of the above-mentioned patent application is hereby incorporated by reference herein and made a part of this specification.

BACKGROUND

Technical Field

The disclosure relates to a tracking system; particularly, the disclosure relates to a tracking system and a calibration method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a tracking system and a calibration method, so as to tracing a user accurately.

In this disclosure, a tracking system with a calibration method is provided. The tracking system includes a camera, an inertial measurement unit (IMU) sensor, and a processor. The camera is configured to obtain camera data. The camera data includes a body image of a body portion of a user. The IMU sensor is configured to obtain sensor data. The IMU sensor is adapted to be mounted on the body portion. The processor is configured to determine the body portion being static or dynamic based on the camera data or the sensor data. In response to the body portion being static, the processor is configured to determine a pose confidence of a current pose of the body portion based on the camera data and calibrate an accumulative error of the sensor data based on the pose confidence and the camera data. In response to the body portion being dynamic, the processor is configured to determine a first moving track of a body moving track of the body portion based on the camera data, determine a second moving track of the body moving track of the body portion based on the sensor data, and calibrate an accumulative error of the sensor data based on the first moving track and the second moving track. The processor is configured to track the body portion based on the sensor data.

In this disclosure, a calibration method for a tracking system is provided. The calibration method includes: obtaining camera data from a camera, wherein the camera data comprises a body image of a body portion of a user; obtaining sensor data from an IMU sensor, wherein the IMU sensor is adapted to be mounted on the body portion; determining the body portion being static or dynamic based on the camera data or the sensor data; in response to the body portion being static, determining a pose confidence of a current pose of the body portion based on the camera data; and calibrating an accumulative error of the sensor data based on the pose confidence and the camera data; in response to the body portion being dynamic, determining a first moving track of a body moving track of the body portion based on the camera data, determining a second moving track of the body moving track of the body portion based on the sensor data, and calibrating the accumulative error of the sensor data based on the first moving track and the second moving track; and tracking the body portion based on the sensor data.

Based on the above, according to the tracking system and the calibration method, an accuracy of tracking is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
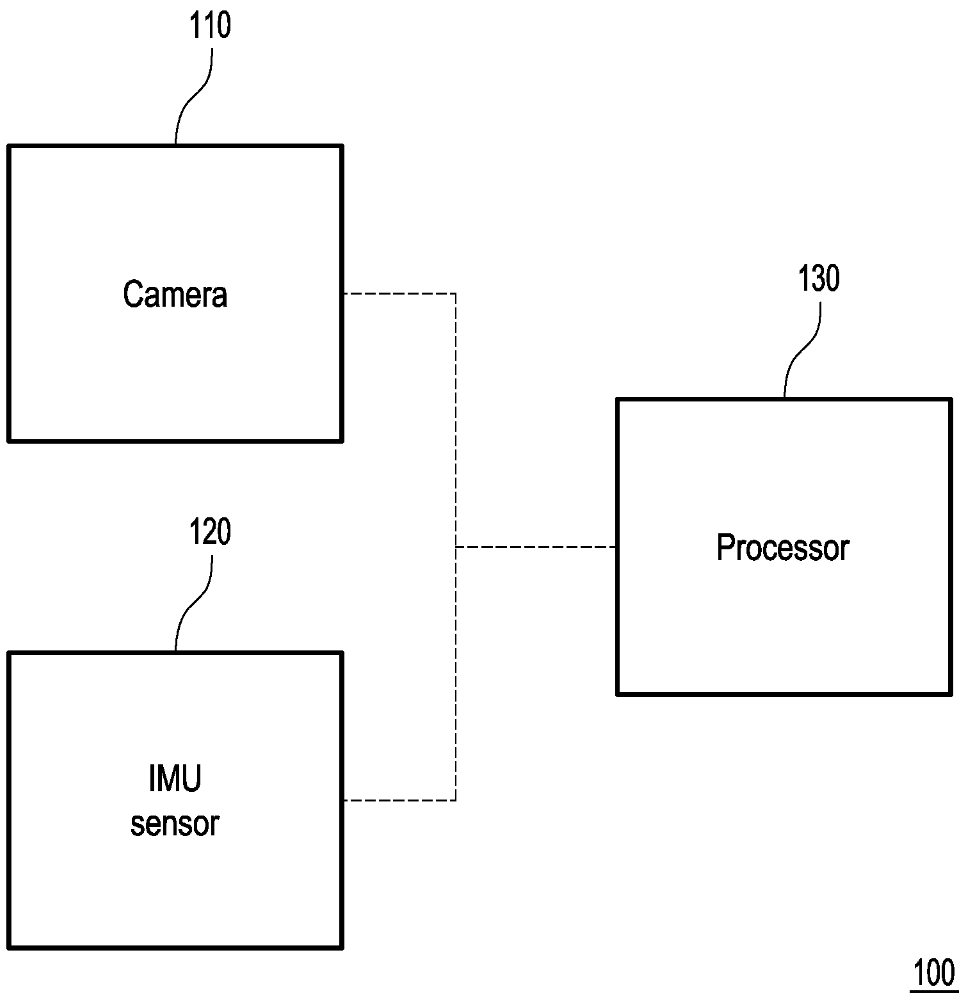
FIG. 1 is a schematic diagram of a tracking system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements.

In order to present a smooth experience in the virtual world, multiple devices are often used to track a movement of a user or an object. For example, an inertial measurement unit (IMU) sensor which comprises accelerometers, gyroscopes, other similar device, or a combination of these devices is commonly used to track the movement of the user or the object. For example, gyroscopes are commonly used to detect the amount of rotation of an object. A rate of rotation is measured in degrees per second, and by integrating the rate of the rotation over time, an angle of the rotation may be obtained. However, the orientation and/or position measurements from the IMU sensor may have a tendency to slowly change over time, even when no external forces are acting on the IMU sensor. This phenomenon is called a drift, which may cause measurement errors. In other words, a gyroscope itself may generate an error during the operation due to time accumulation, thereby causing tracking result of the IMU sensor may be gradually distorted. Thus, a distortion of a virtual object in the virtual world corresponding to the IMU sensor may happen.

There are many ways to resolve the accumulative error. Take the gyroscope for an example. Specifically, the measurement values of the gyroscope may include a pitch angle, a roll angle, and a yaw angle. Due to the physical characteristics, the pitch angle and the roll angle may be corrected using the gravity axis. For the yaw angle, an external device may be used as a reference to correct the accumulative error. For example, the user may be requested to align the gyroscope with the reference in the real world. Alternatively, the user may be requested to perform a sequence of poses to correct the accumulative error. Moreover, a depth camera may be used to correct the accumulated error. That is, most of the solutions are not so intuitive and an external device with the ability to sense depth information may be needed. Therefore, it is the pursuit of people skilled in the art to provide an intuitive and convenient way to calibrate the accumulative error of a gyroscope or an IMU sensor.

FIG. 1 is a schematic diagram of a tracking system according to an embodiment of the disclosure. With reference to FIG. 1, a tracking system 100 with a calibration method may include a camera 110, an inertial measurement unit (IMU) sensor 120, and a processor 130. The camera 110, the IMU sensor 120, and the processor 130 may be coupled to each other or may communicate with each other.

In one embodiment, the camera 110 may be configured to obtain camera data. The camera data may include a body image of a body portion of a user. The IMU sensor 120 may be configured to obtain sensor data. The IMU sensor 120 may be adapted to be mounted on the body portion. The processor 130 may be configured to determine the body portion being static or dynamic based on the camera data or the sensor data. Afterwards, in response to the body portion being static, the processor 130 may be configured to determine a pose confidence of a current pose of the body portion based on the camera data and calibrate an accumulative error of the sensor data based on the pose confidence and the camera data. Further, in response to the body portion being dynamic, the processor 130 may be configured to determine a first moving track of a body moving track of the body portion based on the camera data. Then, the processor 130 may be configured to determine a second moving track of the body moving track of the body portion based on the sensor data. After that, the processor 130 may be configured to calibrate an accumulative error of the sensor data based on the first moving track and the second moving track. In addition, the processor 130 may be configured to track the body portion based on the sensor data.

In this manner, the accumulative error of the sensor data of the IMU sensor 120 may be calibrated in the background while the user does not even notice the calibration. That is, the user does not have to perform a sequence of poses to correct the accumulative error. Further, only RGB information from the camera data is needed and no depth information is needed. Therefore, the calibration of the accumulative error is achieved in an intuitive and convenient manner, thereby improving the user experience.

In one embodiment, the camera 110, may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. The disclosure is not limited thereto.

In one embodiment, the IMU sensor 120 may include, for example, a gyroscope, an accelerometer, other similar devices, or a combination of these devices. However, this disclosure is not limited thereto. In one embodiment, the sensor data may include, for example, three angular velocities (e.g., a roll angular velocity, a pitch angular velocity, and a yaw angular velocity about an X axis, a Y axis, and a Z axis), three linear acceleration values along the X axis, the Y axis, and the Z axis, or a combination of the three angular velocities and the three linear acceleration values. However, this disclosure is not limited thereto.

In one embodiment, the processor 130 includes, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 130 may be achieved as multiple program codes. The program codes are stored in a memory, and executed by the processor 130. Alternatively, in an embodiment, each of the functions of the processor 130 may be achieved as one or more circuits. The disclosure does not limit the use of software or hardware to achieve the functions of the processor 130.

Figure 2A:
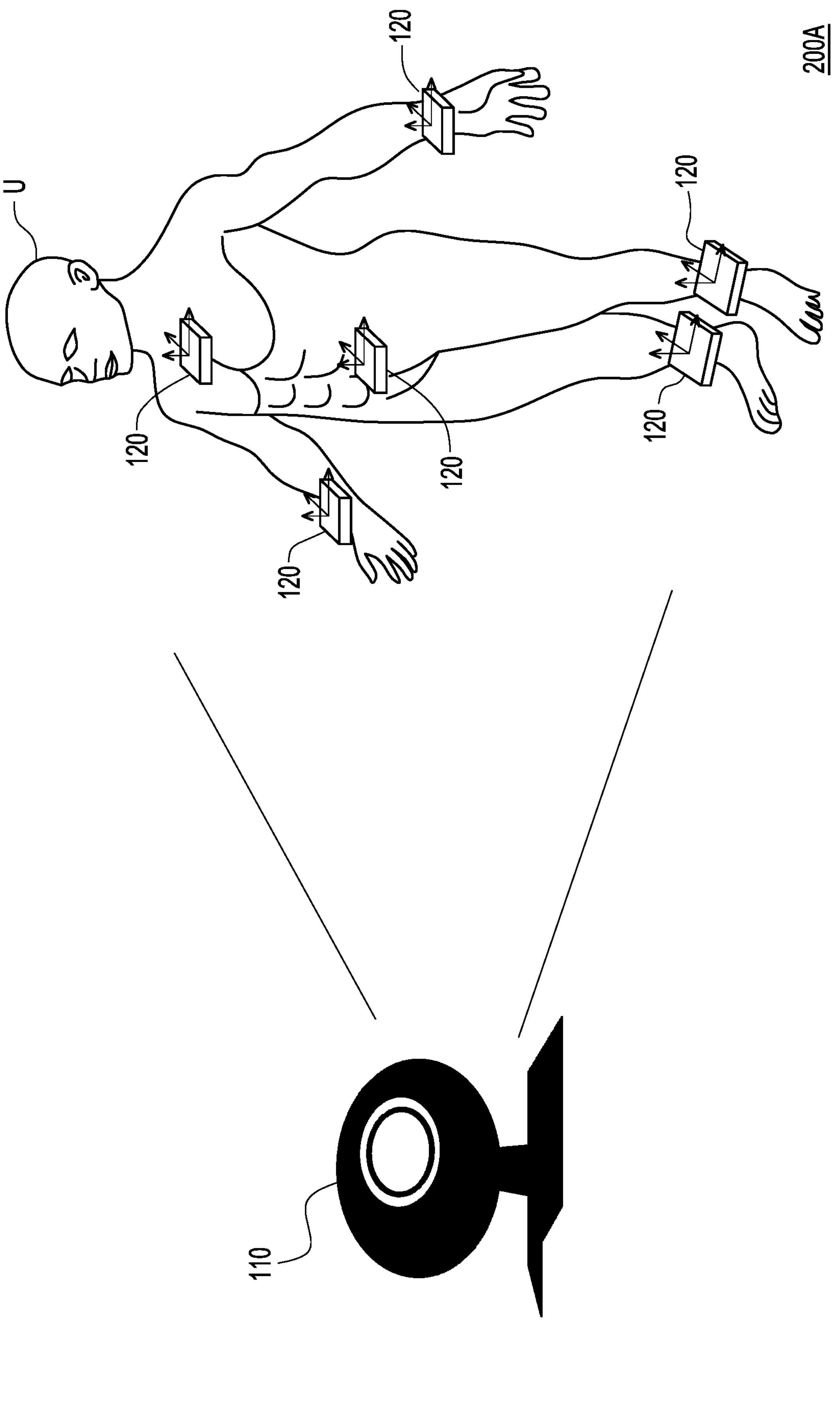
FIG. 2A is a schematic diagram of a calibration scenario according to an embodiment of the disclosure.
Figure 2B:
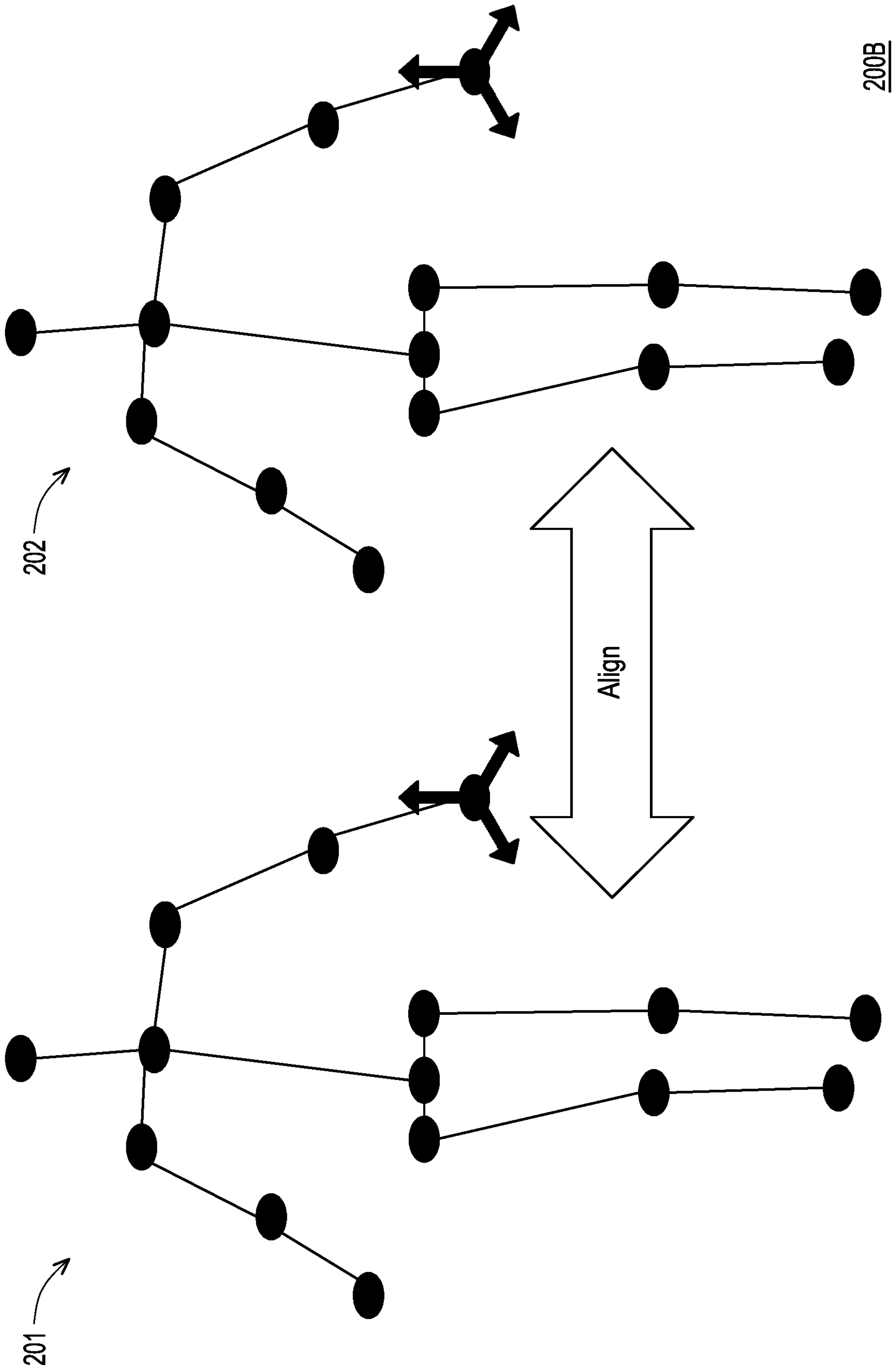
FIG. 2B is a schematic diagram of a calibration scenario according to an embodiment of the disclosure.

FIG. 2A is a schematic diagram of a calibration scenario according to an embodiment of the disclosure. FIG. 2B is a schematic diagram of a calibration scenario according to an embodiment of the disclosure. With reference to FIG. 1 to FIG. 2B, FIG. 2A depict a calibration scenario 200A of the tracking system 100 and FIG. 2B depicts a calibration scenario 200B including body joints based on the camera data and the sensor data.

Referring to FIG. 2A, the camera 110 may be disposed facing the user U and configured to capture images of the user U as the camera data. Further, the IMU sensor 120 may be mounted on a body portion of the user U. In one embodiment, the body portion may be a joint of the user U or close to a joint of the user U. For example, the body portion may be a neck, a wrist, an elbow, a shoulder, a waist, a knee, or an ankle, and is not limited thereto. In one embodiment, the IMU sensor 120 may be embedded in a wearable device and the wearable device is adapted to be worn on the body portion of the user U.

In one embodiment, based on the camera data or the sensor data, the processor 130 may be configured to determine the body portion being static or nearly static. For example, in the camera data, a pose of the user U may stay at a same pose or moving really slow (e.g., under a predetermined velocity). Alternatively, in the sensor data, three angular velocities and three linear acceleration values of the sensor data may all be zero or close to zero (e.g., under a predetermined value). However, this disclosure is not limited thereto.

In one embodiment, a pose confidence may be configured to evaluate an accuracy of a current pose of the body portion. That is, the processor 130 may be configured to determine a pose confidence of a current pose of the body portion based on the camera data. Further, in response to the pose confidence being greater than a confidence threshold, the processor 130 may be configured to determine a camera coordinate value of the current pose. Furthermore, based on a transformation relationship (which may be previously obtained or calibrated) from the camera coordinate value to a IMU coordinate value of the IMU sensor 120, the accumulative error of the sensor data of the IMU sensor 120 may be calibrated. On the other hand, in response to the pose confidence not being greater than a confidence threshold, the processor 130 may be configured to obtain an additional frame of additional camera data to fuse with a current frame of the camera data. Therefore, by perform a fusion of the camera data and the additional camera data, the pose confidence may be increased and may be greater than the confidence threshold.

Moreover, an additional camera and/or an additional IMU sensor may be used in the calibration scenario 200A. The additional camera may be disposed facing the user U and the additional IMU sensor may be adapted to be mounted on an additional body portion of the user U. That is, a number of the camera 110 and/or the IMU sensor 120 may be more than one, but this disclosure is not limited thereto. The additional camera may be configured to obtain an additional camera data and the additional IMU sensor may be configured to obtain an additional sensor data. The additional camera data may be configured to improve an accuracy of the camera data or improve a pose confidence of a current pose of the body portion of the user U. The additional sensor data together with sensor data may be configured to further improve the pose confidence of the current pose of the body portion of the user U. Therefore, by perform a fusion of the camera data and the additional camera data, the pose confidence may be increased and may be greater than the confidence threshold.

Referring to FIG. 2B, based on the camera data and/or the additional camera data, a first body pose 201 may be determined. The first body pose 201 may include a plurality of camera joints corresponding to the joints of the user U. Similarly, based on the sensor data and/or the additional sensor data, a second body pose 202 may be determined. The second body pose 202 may include a plurality of sensor joints corresponding to the joints of the user U where the IMU sensor 120 and the additional IMU sensor are mounted on. That is, the sensor joints may include a first joint and a second joint. The body portion where the IMU sensor 120 is mounted on may be the first joint and the additional body portion where the additional IMU sensor is mounted on may be the second joint. For example, the first joint may be a wrist joint and the second joint may be an elbow joint, but this disclosure is not limited thereto.

In one embodiment, based on the first body pose 201 and/or the second body pose 202, a first distance and a second distance between two joints may be determined respectively. For example, based on the first body pose 201, a first distance between the first joint (e.g., where the body portion is) and the second joint (where the additional body portion is) may be determined. Similarly, based on the second body pose 202, a second distance between the body portion and the additional body portion may be determined. Since the accumulative error of the sensor data may accumulate over time, by comparing the first distance with the second distance, the accumulative error may be calibrated. That is, the first distance may be used as a reference distance, and the second distance may be configured to align with the first distance to calibrate the accumulative error of the sensor data of the IMU sensor 120. Further, since the accumulative error is calibrated, directions of three axes of the sensor data of the IMU sensor 120 may be also calibrated.

In other words, in response to the body portion being static, the processor 130 may be configured to obtain an additional sensor data from an additional IMU sensor, wherein the additional IMU sensor is adapted to be mounted on an additional body portion. Further, the processor 130 may be configured to determine a first distance between the body portion and the additional body portion based on the camera data. Furthermore, the processor 130 may be configured to determine a second distance between the body portion and the additional body portion based on the sensor data and the additional sensor data. Then, the processor 130 may be configured to calibrate the accumulative error of the sensor data based on the first distance and the second distance.

In this manner, the accumulative error of the sensor data of the IMU sensor 120 may be calibrated in the background while the user U does not even notice the calibration, thereby improving the user experience.

Figure 3A:
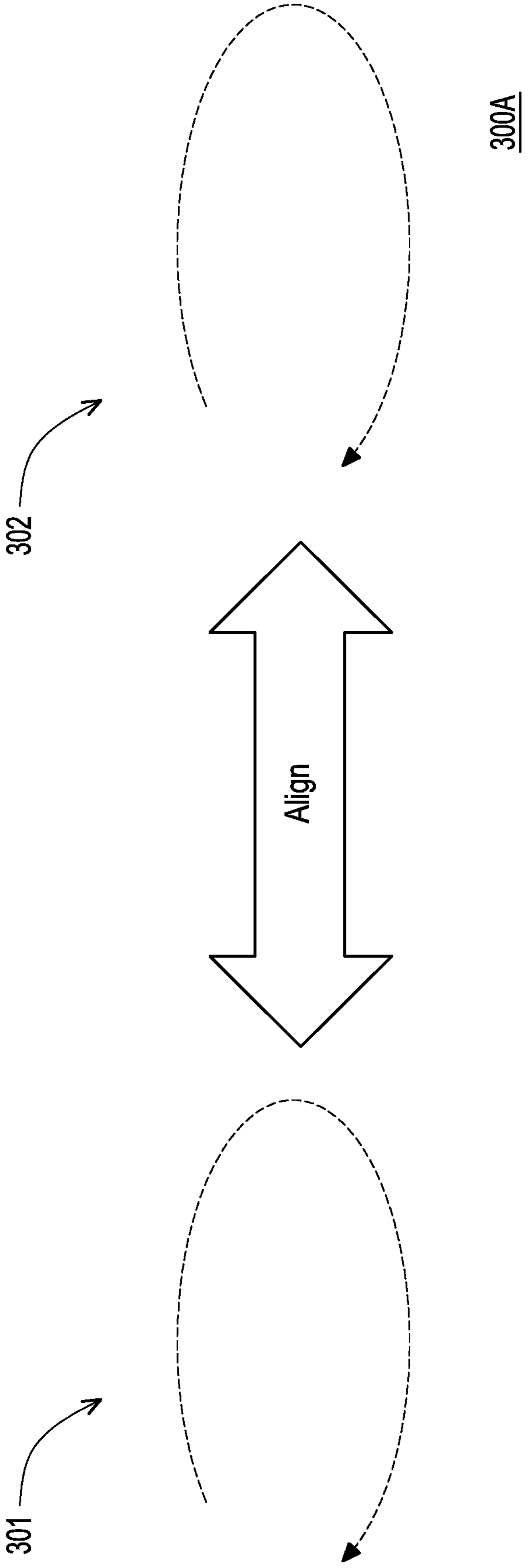
FIG. 3A is a schematic diagram of a calibration scenario according to an embodiment of the disclosure.
Figure 3B:
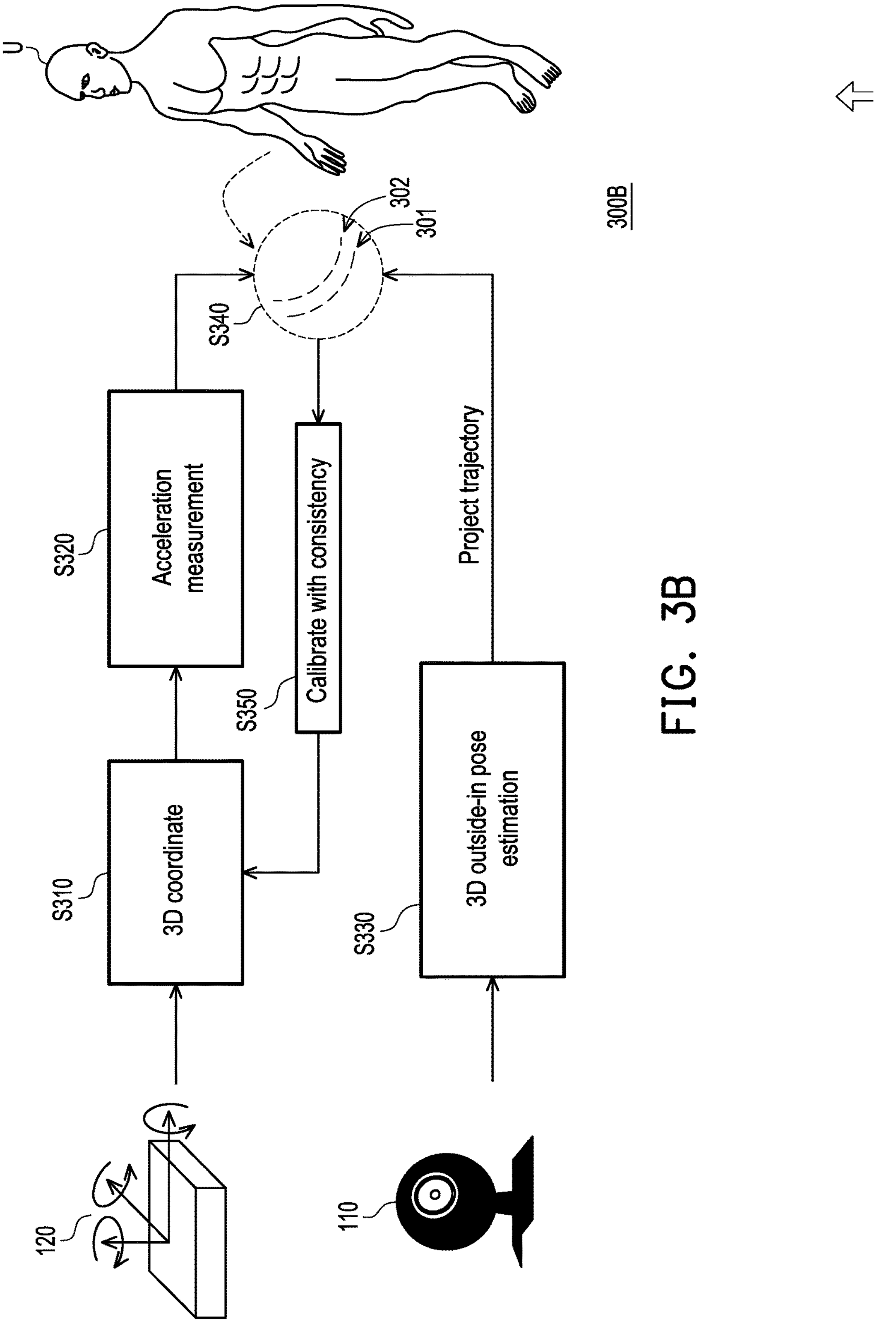
FIG. 3B is a schematic diagram of a calibration scenario according to an embodiment of the disclosure.

FIG. 3A is a schematic diagram of a calibration scenario according to an embodiment of the disclosure. FIG. 3B is a schematic diagram of a calibration scenario according to an embodiment of the disclosure. With reference to FIG. 1, FIG. 3A and FIG. 3B, FIG. 3A depict a calibration scenario 300A including moving tracks based on the camera data and the sensor data and FIG. 3B depicts a calibration scenario 300B including steps of utilizing the moving tracks for calibration of the accumulative error of the sensor data.

It is noted that, different technologies have been developed to track a movement of the user U. For example, there are two main categories of tracking technologies, which are inside-out tracking and outside-in tracking. The inside-out tracking is to track the movement in view of an internal device itself (e.g., the IMU sensor 120) relative to an outside environment. The outside-in tracking is to track the movement in view of an external device (e.g., the camera 110), which is disposed separately from the internal device and configured to observe/track the movement of the internal device.

Referring to FIG. 3A, by utilizing the tracking system 100, in response to a movement of the body portion of the user U, a first moving track 301 of the body portion may be obtained based on the camera data and a second moving track 302 of the body portion may be obtained based on the sensor data. For example, the processor 130 may be configured to generate the first moving track 301 according to the body image based on a simultaneous localization and mapping (SLAM) algorithm. Further, the IMU sensor 120 may be configured to detect a linear acceleration or an angular velocity of the body portion and the processor 130 may be configured to generate the second moving track 302 according to the linear acceleration or the angular velocity. That is, the camera 110 provides an outside-in tracking function to the tracking system 100 and the IMU sensor 120 provides an inside-out tracking function to the tracking system 100. In other words, the processor 130 may be configured to obtain the first moving track 301 based on an outside-in tracking algorithm and configured to obtain the second moving track 302 based on an inside-out tracking algorithm.

Referring to FIG. 3B, the calibration scenario 300B may include a step S310 to a step S350. During an interval of time, the user U may move the body portion to create a moving track of the body portion. In the step S310, a 3D coordinate of the IMU sensor 120 may be established based on the sensor data. In a step S320, an acceleration measurement may be performed to obtain the second moving track 302 corresponding to the moving track. In a step S330, a 3D outside-in pose estimation may be performed to obtain the first moving track 301. Further, the first moving track 301 may be projected to the 3D coordinate of the IMU sensor 120. That is, a trajectory obtained by the camera 110 may be projected to the 3D coordinate of the IMU sensor 120. In a step S340, in the 3D coordinate of the IMU sensor 120, the first moving track 301 may be aligned with the second moving track 302 to determine a consistency between the first moving track 301 and the second moving track 302. In the step S350, an accumulative error of the sensor data may be calibrated based on the consistency.

For example, the processor 130 may be configured to align the first moving track 301 with the second moving track 302. Then, the processor 130 may be configured to calculate a drift calibration matrix between the outside-in coordinate system of the first moving track 301 and the inside-out coordinate system of the second moving track 302. After that, the processor 130 may be configured to determine the calibrated data by applying the drift calibration matrix to the sensor data.

In this manner, the accumulative error of the sensor data of the IMU sensor 120 may be calibrated in the background while the user U does not even notice the calibration, thereby improving the user experience.

Figure 4:
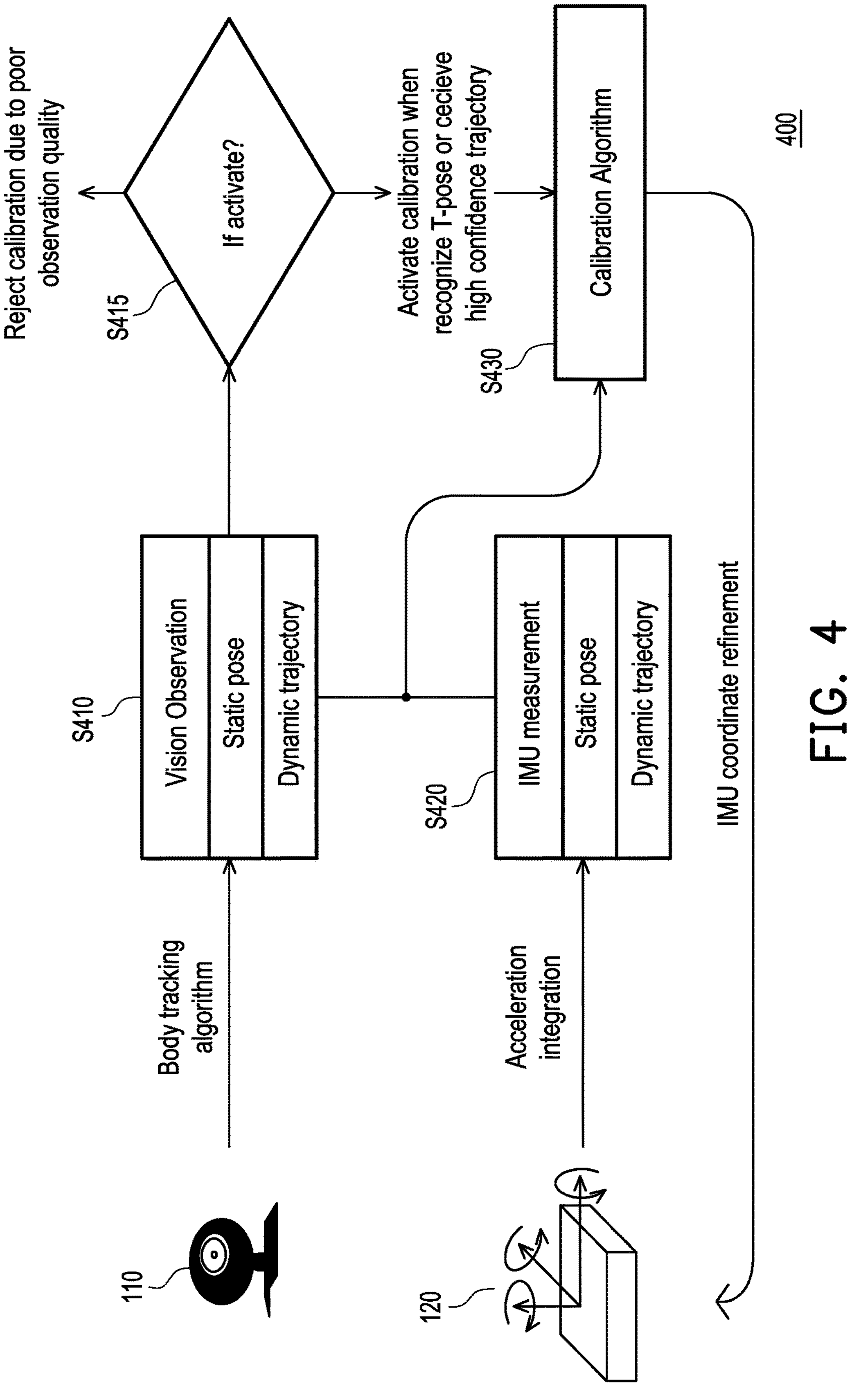
FIG. 4 is a schematic diagram of a software structure of a tracking system according to an embodiment of the disclosure.

FIG. 4 is a schematic diagram of a software structure of a tracking system according to an embodiment of the disclosure. With reference to FIG. 1 and FIG. 4, a software structure 400 of the tracking system 100 may include a step S410 to a step S430.

In the step S410, based on a body tracking algorithm, a vision observation of the body portion of the user U may be obtained. The vision observation may include a static pose (e.g., the first body pose 201) and a dynamic trajectory (e.g., the first moving track 301). In a step S415, a pose confidence of the static pose or a track confidence of the dynamic trajectory may be evaluated to determine whether or not to activate the calibration of the accumulative error of the sensor data. For example, if the observation quality is poor (e.g., low pose confidence or low track confidence), the calibration may be rejected. On the other hand, if the observation quality is good (e.g., high pose confidence or high track confidence), a pose (e.g., T-pose) of the user U may be recognized or a high confidence trajectory may be received. Under such circumstances, the calibration may be activated.

In a step S420, based on an acceleration integration, an IMU measurement of the body portion of the user U may be obtained. The IMU measurement may include a static pose (e.g., the second body pose 202) and a dynamic trajectory (e.g., the second moving track 302). In the step S430, a calibration algorithm may be performed based on the vision observation and the IMU measurement to refine an IMU coordinate.

Figure 5:
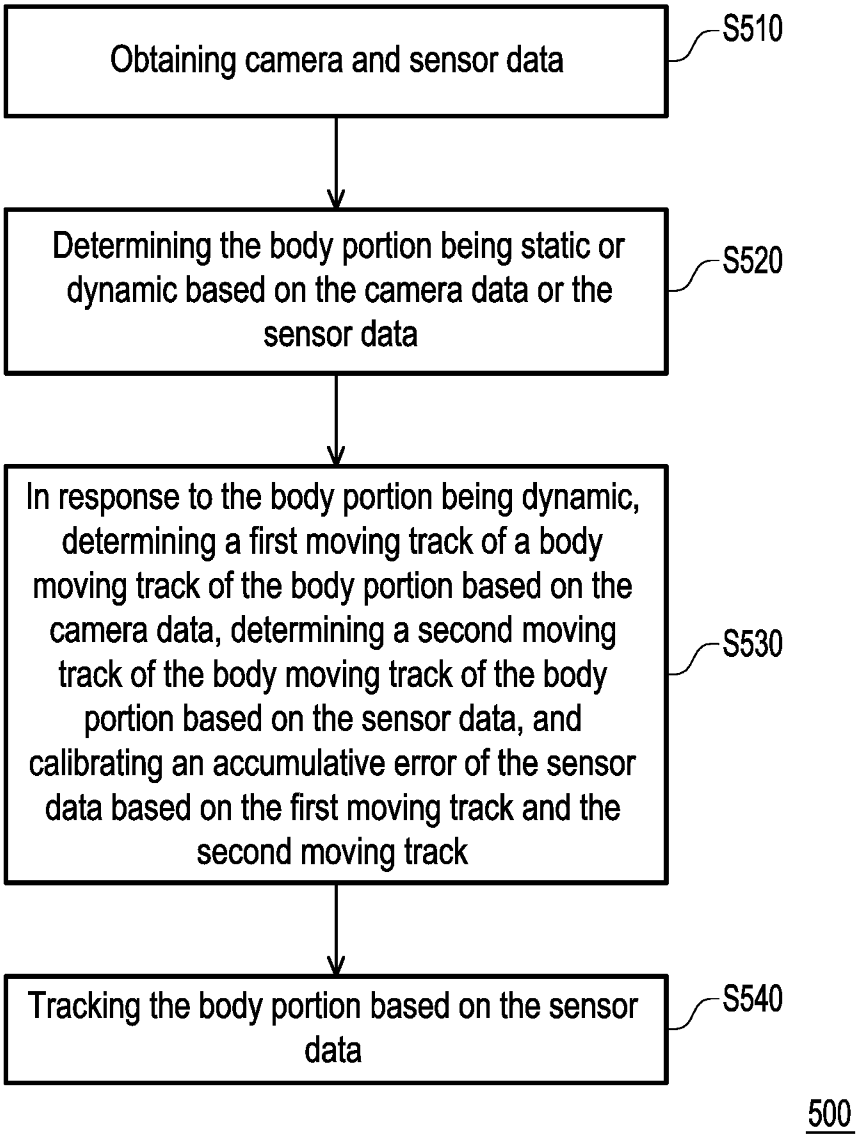
FIG. 5 is a schematic flowchart of a calibration method according to an embodiment of the disclosure.

FIG. 5 is a schematic flowchart of a calibration method according to an embodiment of the disclosure. With reference to FIG. 1 and FIG. 5, a calibration method 500 for the tracking system 100 may include a step S510 to a step S540.

In the step S510, the camera data of the camera 110 and the sensor data of the IMU sensor 120 may be obtained. In a step S520, the body portion being static or dynamic may be determined based on the camera data or the sensor data. In a step S530, in response to the body portion being dynamic, a first moving track 301 of a body moving track of the body portion may be determined based on the camera data and a second moving track 302 of the body moving track of the body portion may be determined based on the sensor data. Further, an accumulative error of the sensor data may be calibrated based on the first moving track 301 and the second moving track 302. In the step S540, the body portion may be tracked based on the sensor data.

In addition, the implementation details of the calibration method 500 may be referred to the descriptions of FIG. 1 to FIG. 4 to obtain sufficient teachings, suggestions, and implementation embodiments, while the details are not redundantly described seriatim herein.

In summary, according to the tracking system 100 and the calibration method 500, the accumulative error of the sensor data of the IMU sensor 120 may be calibrated in the background while the user U does not even notice the calibration. That is, the user U does not have to perform a sequence of poses to correct the accumulative error. Further, only RGB information from the camera data is needed and no depth information is needed. Therefore, the calibration of the accumulative error is achieved in an intuitive and convenient manner, thereby improving the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tracking system with a calibration method, comprising:

a camera, configured to obtain camera data, wherein the camera data comprises a body image of a body portion of a user;

an inertial measurement unit (IMU) sensor, configured to obtain sensor data, wherein the IMU sensor is adapted to be mounted on the body portion; and a processor, configured to:

determine whether the body portion is in a static state or in a dynamic state based on the camera data or the sensor data;

in response to determining the body portion is in the static state, determine a pose confidence of a current pose of the body portion based on the camera data, wherein the pose confidence is configured to evaluate an accuracy of the current pose of the body portion; and when the pose confidence is greater than a confidence threshold, calibrate an accumulative error of the sensor data based on the pose confidence and the camera data;

in response to determining the body portion is in the dynamic state, determine a first moving track of a body moving track of the body portion based on an outside-in algorithm using the camera data, determine a second moving track of the body moving track of the body portion based on an inside-out algorithm using the sensor data, and calibrate the accumulative error of the sensor data based on the first moving track and the second moving track to determine a calibrated sensor data; and track the body portion based on the calibrated sensor data.

2. The tracking system according to claim 1, wherein processor is further configured to:

obtain the first moving track based on the outside-in tracking algorithm; and obtain the second moving track based on the inside-out tracking algorithm.

3. The tracking system according to claim 1, wherein the processor is further configured to:

align the first moving track with the second moving track;

calculate a drift calibration matrix between an outside-in coordinate system of the first moving track and an inside-out coordinate system of the second moving track; and determine the calibrated sensor data by applying the drift calibration matrix to the sensor data.

4. The tracking system according to claim 1, wherein the processor is configured to generate the first moving track according to the body image based on a simultaneous localization and mapping algorithm.

5. The tracking system according to claim 1, wherein the IMU sensor is configured to detect a linear acceleration or an angular velocity of the body portion, and the processor is configured to generate the second moving track according to the linear acceleration or the angular velocity.

6. The tracking system according to claim 1, wherein the processor is configured to:

in response to determining the body portion is in the static state and the pose confidence is greater than the confidence threshold, determine a camera coordinate value of the current pose; and calibrate the accumulative error of the sensor data based on a transformation relationship from the camera coordinate value to a IMU coordinate value of the IMU sensor.

7. The tracking system according to claim 1, wherein the processor is configured to:

in response to determining the body portion is in the static state and the pose confidence is not greater than the confidence threshold, obtain an additional frame of additional camera data from the camera to fuse with a current frame of the camera data; and determine the pose confidence of the current pose of the body portion based on the camera data and the additional data.

8. The tracking system according to claim 1, wherein the processor is configured to:

in response to determining the body portion is in the static state and the pose confidence is greater than the confidence threshold, obtain an additional sensor data from an additional IMU sensor, wherein the additional IMU sensor is adapted to be mounted on an additional body portion, determine a first distance between the body portion and the additional body portion based on the camera data, determine a second distance between the body portion and the additional body portion based on the sensor data and the additional sensor data, and calibrate the accumulative error of the sensor data based on the first distance and the second distance.

9. The tracking system according to claim 8, wherein the processor is configured to:

in response to determining the body portion is in the static state and the pose confidence is not greater than the confidence threshold, obtain an additional camera data from an additional camera to fuse with the camera data; and determine the pose confidence of the current pose of the body portion based on the camera data and the additional data.

10. The tracking system according to claim 8, wherein the body portion is a first joint of the user and the additional body portion is a second joint of the user.

11. A calibration method for a tracking system, comprising:

obtaining camera data from a camera, wherein the camera data comprises a body image of a body portion of a user;

obtaining sensor data from an inertial measurement unit (IMU) sensor, wherein the IMU sensor is adapted to be mounted on the body portion;

determining a first period in which the body portion is in a static state and a second period in which the body portion is in a dynamic state based on the camera data or the sensor data;

in response to the body portion being in the static state during the first period, determining a pose confidence of a current pose of the body portion based on the camera data, wherein the pose confidence is configured to evaluate an accuracy of the current pose of the body portion; and when the pose confidence is greater than a confidence threshold, calibrating an accumulative error of the sensor data based on the pose confidence and the camera data;

in response to the body portion being in the dynamic state during the second period, determining a first moving track of a body moving track of the body portion based on an outside-in tracking algorithm using the camera data, determining a second moving track of the body moving track of the body portion based on an inside-out tracking algorithm using the sensor data, and calibrating the accumulative error of the sensor data based on the first moving track and the second moving track to determine a calibrated sensor data; and tracking the body portion based on the calibrated sensor data.

12. The calibration method according to claim 11, further comprising:

obtaining the first moving track based on the outside-in tracking algorithm; and obtaining the second moving track based on the inside-out tracking algorithm.

13. The calibration method according to claim 11, further comprising:

aligning the first moving track with the second moving track;

calculating a drift calibration matrix between an outside-in coordinate system of the first moving track and an inside-out coordinate system of the second moving track; and determining the calibrated sensor data by applying the drift calibration matrix to the sensor data.

14. The calibration method according to claim 11, further comprising:

generating the first moving track according to the body image based on a simultaneous localization and mapping algorithm.

15. The calibration method according to claim 11, wherein the IMU sensor is configured to detect a linear acceleration or an angular velocity of the body portion, and the calibration method further comprises:

generating the second moving track according to the linear acceleration or the angular velocity.

16. The calibration method according to claim 11, further comprising:

in response to the body portion being in the static state during the first period and the pose confidence being greater than the confidence threshold, determining a camera coordinate value of the current pose; and calibrating the accumulative error of the sensor data based on a transformation relationship from the camera coordinate value to a IMU coordinate value of the IMU sensor.

17. The calibration method according to claim 11, further comprising:

in response to the body portion being in the static state during the first period and the pose confidence not being greater than the confidence threshold, obtaining an additional frame of additional camera data from the camera to fuse with a current frame of the camera data; and determining the pose confidence of the current pose of the body portion based on the camera data and the additional data.

18. The calibration method according to claim 11, further comprising:

in response to the body portion being in the static state during the first period and the pose confidence being greater than the confidence threshold, obtaining an additional sensor data from an additional IMU sensor, wherein the additional IMU sensor is adapted to be mounted on an additional body portion, determining a first distance between the body portion and the additional body portion based on the camera data, determining a second distance between the body portion and the additional body portion based on the sensor data and the additional sensor data, and calibrating the accumulative error of the sensor data based on the first distance and the second distance.

19. The calibration method according to claim 18, further comprising:

in response to the body portion being in the static state and the pose confidence not being greater than the confidence threshold, obtaining an additional camera data from an additional camera to fuse with the camera data; and determining the pose confidence of the current pose of the body portion based on the camera data and the additional data.

20. The calibration method according to claim 18, wherein the body portion is a first joint of the user and the additional body portion is a second joint of the user.

* * * * *